(12) United States Patent
Shikama

(10) Patent No.: US 12,529,939 B2
(45) Date of Patent: Jan. 20, 2026

(54) CAMERA MODULE, CAMERA, AND ELECTRONIC DEVICE

(71) Applicant: AAC Optics Solutions Pte. Ltd., Singapore (SG)

(72) Inventor: Kazuo Shikama, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 284 days.

(21) Appl. No.: 18/539,278

(22) Filed: Dec. 14, 2023

(65) Prior Publication Data

US 2025/0013122 A1  Jan. 9, 2025

(30) Foreign Application Priority Data

Jul. 7, 2023  (JP) .................................. 2023-112145

(51) Int. Cl.
*G03B 9/18* (2021.01)
*G03B 17/02* (2021.01)

(52) U.S. Cl.
CPC ............... *G03B 9/18* (2013.01); *G03B 17/02* (2013.01)

(58) Field of Classification Search
CPC ........................................................ G03B 9/22
See application file for complete search history.

(56) References Cited

U.S. PATENT DOCUMENTS

2019/0373145 A1* 12/2019 Yu .......................... G02B 7/102
2022/0413359 A1* 12/2022 Fu ............................ G03B 9/06
2024/0061317 A1*  2/2024 You ......................... G03B 3/10

* cited by examiner

*Primary Examiner* — Noam Reisner
(74) *Attorney, Agent, or Firm* — Wiersch Law Group

(57) ABSTRACT

Embodiments of the disclosure relate to a camera module. The base is provided with a driving member, the driving member is used for driving a lens supporting frame to move and focus along an optical axis direction, and the driving member is further configured to drive the blade driving frame to rotate around the optical axis. That is to say, the driving member for driving the light-shielding blades and the driving member for driving the lens to focus are the same, so that the number of elements of the camera module can be reduced, thereby reducing the volume and weight of the camera module, and avoiding interference between the structure for focusing in the camera module and the power mechanism for driving the light-shielding blades. The embodiments of the disclosure further disclose a camera and an electronic device.

20 Claims, 15 Drawing Sheets

CAMERA MODULE, CAMERA, AND ELECTRONIC DEVICE

CROSS REFERENCE TO RELATED APPLICATIONS

The present application claims the benefit of priority under the Paris Convention to Japanese Patent Application No. 2023-112145 filed on Jul. 7, 2023, which is incorporated herein by reference in its entirety.

TECHNICAL FIELD

The various embodiments described in this document relate in general to the technical field of camera devices, and more specifically to a camera module, a camera, and an electronic device.

BACKGROUND

The aperture (adjustable diaphragm) is used to change the amount of light entering an optical system to participate in imaging. Providing the aperture in a camera module allows the camera module to adapt to shooting needs of different light scenes by adjusting the size (e.g., focal ratio) of the aperture. A focusing mechanism can realize the focusing of the camera module by changing a position of the lens, so that the camera module can shoot the target object more clearly. The combination of the aperture and the focusing mechanism can improve the shooting performance of the camera module. Therefore, the camera module with the aperture and the focusing mechanism is applied to electronic devices, such as smart phones, tablet computers, etc., which is favored by consumers.

By driving a plurality of blades to move with a blade driving device, a size of an opening surrounded by the blades can be changed, which can be applied to different optical units on cameras such as shutters, apertures, or optical filters. In an optical system that uses a lens driving device to move a lens to realize adjustment, the blade driving device may hinder the action and configuration of the lens driving device due to factors such as size, weight, and multi-directional protrusions in the assembly direction. Although a small blade driving mechanism made of shape memory metal can be used to overcome the problems of large weight and volume, when a large change in the size of the opening surrounded by the blades is required, a length of the shape memory metal needs to be increased, which still cannot effectively solve various problems caused by the large volume and weight of the blade driving mechanism.

In addition, to avoid interference between the blade driving mechanism and the focusing mechanism, the servo control of the focusing mechanism may be affected. Alternatively, the weight of the blade driving mechanism needs to be evenly distributed over the entire circumference in order that the blade driving mechanism can be moved accordingly to properly block light when the lens is moved. Such design solutions are difficult to implement and the reliability of the resulting product cannot be guaranteed.

Therefore, it is necessary to provide a camera module to solve the above technical problems.

SUMMARY

Embodiments of the disclosure aims to provide a camera module, a camera, and an electronic device, which can reduce the volume and weight of the camera module and avoid interference between a focusing mechanism and a blade driving mechanism in the camera module.

In order to solve the above technical problems, a first aspect of the disclosure provides a camera module, including: a camera lens; a base provided with a driving member; a lens supporting frame sleeved on an outer edge of the camera lens, where the driving member is configured to drive the lens supporting frame to move and focus along an optical axis direction; a blade driving frame rotatably disposed on the base with an optical axis as a rotating axis and sleeved on an outer side of the camera lens, where the driving member is further configured to drive the blade driving frame to rotate; a blade driving ring disposed on the blade driving frame and rotatably sleeved on the outer side of the camera lens with the optical axis as a rotating axis, where the blade driving frame is driven to rotate by the driving member to drive the blade driving ring to rotate; a plurality of light-shielding blades circumferentially arranged on the blade driving ring and spaced apart from each other, where in rotation of the blade driving ring, the plurality of light-shielding blades are driven to gather or separate; and a blade supporting member buckled and fixed on an object side of the lens supporting frame, where the plurality of light-shielding blades are located between the blade driving ring and the blade supporting member, each of the plurality of light-shielding blades is rotatably connected to the blade supporting member, and the blade supporting member is configured to support the plurality of light-shielding blades.

In some embodiments, the lens supporting frame is provided with a first slave driven member, and the driving member is configured to drive the first slave driven member to move, to drive the lens supporting frame to move and focus along the optical axis direction; and the blade driving frame is provided with a second slave driven member, and the driving member is configured to drive the second slave driven member to rotate, to drive the blade driving frame to rotate.

In some embodiments, the driving member is a magnetic steel, the first slave driven member is a focusing coil, and the second slave driven member is a blade driving coil; in response to the focusing coil being energized, the magnetic steel is configured to drive the focusing coil to move along the optical axis direction, to drive the lens supporting frame to move and focus along the optical axis direction; and in response to the blade driving coil being electrified, the magnetic steel is configured to drive the blade driving coil to rotate around the optical axis, to drive the blade driving frame to rotate around the optical axis.

In some embodiments, the base defines at least three arc-shaped first accommodating grooves on a side of the base facing the blade driving frame, the blade driving frame defines at least three arc-shaped second accommodating grooves on a side of the blade driving frame facing the base; and the at least three first accommodating grooves and the at least three second accommodating grooves are arranged in one-to-one correspondence and form accommodating spaces, where each of the accommodating spaces accommodates a spherical supporting member, and the spherical supporting member abuts against an inner wall of a respective first accommodating groove and an inner wall of a respective second accommodating groove concurrently.

In some embodiments, the camera module further comprises a blade holding component fixed to the blade driving frame, where the blade holding component is cooperated with the driving member to keep the blade driving frame at an initial position in a power-off state.

In some embodiments, the blade driving ring defines a plurality of through slots spaced apart from one another in a circumferential direction of the blade driving ring; each respective through groove of the plurality of through grooves extends from an outer edge of the blade driving ring to an inner edge of the blade driving ring, and an extending direction of the respective through groove forms an angle with a radial direction of the blade driving ring; and each respective light-shielding blade of the plurality of light-shielding blades is an arc-shaped sheet, the respective light-shielding blade is provided with a guide portion at an end of the respective light-shielding blade, and the guide portion is located on a surface of an image side of the respective light-shielding blade, where a plurality of guide portions of the plurality of light-shielding blades are arranged in one-to-one correspondence with and slidably inserted into the plurality of through slots.

In some embodiments, the blade supporting member defines a plurality of positioning holes spaced apart from each other and in a circumferential direction of the blade supporting member, and the respective light-shielding blade is provided with a positioning portion on another end of the respective light-shielding blade, where the positioning portion is located on a surface of an object side of the respective light-shielding blade, and positioning portions of the plurality of light-shielding blades are in one-to-one correspondence with the plurality of positioning holes and rotatably inserted into the plurality of positioning holes.

In some embodiments, the blade driving ring is provided with a connecting arm, the blade driving frame defines a connecting slot, and the connecting arm is slidably inserted into the connecting slot along the optical axis direction to enable the blade driving ring and the blade driving frame to be clamped and connected with each other.

In some embodiments, the camera module further comprises a shell having a receiving space. The base, the lens supporting frame, and the blade driving frame are located in the receiving space; and the shell has a central through hole for exposing the blade driving ring, the plurality of light-shielding blades, and the blade supporting member, and the shell is made of a magnetic material.

In some embodiments, the camera module further comprises an anti-shake mechanism and a sensor assembly provided on the anti-shake mechanism. The anti-shake mechanism is located on an image side of the base, and the anti-shake mechanism is configured to drive the sensor assembly to realize anti-shaking.

In some embodiments, a second aspect of the disclosure provides a camera, including: a camera body and the camera module described above, where the camera module is provided on the camera body.

In some embodiments, a third aspect of the disclosure provide an electronic device, including: a device body and the camera module described above, where the camera module is provided on the device body.

Compared with the related technologies, in the embodiments of the disclosure, the base is provided with a driving member, the driving member is used for driving a lens supporting frame to move and focus along an optical axis direction, and the driving member is further configured to drive the blade driving frame to rotate around the optical axis. When the blade driving frame rotates, the blade driving frame drives a blade driving ring to rotate synchronously, and the blade driving ring drives a plurality of light-shielding blades to gather or separate, thereby realizing the adjustment of the size of the opening surrounded by the light-shielding blades. That is to say, the driving member for driving the light-shielding blades and the driving member for driving the lens to focus are the same, so that the number of elements of the camera module can be reduced, thereby reducing the volume and weight of the camera module, and avoiding interference between the structure for focusing in the camera module and the power mechanism for driving the light-shielding blades.

BRIEF DESCRIPTION OF THE DRAWINGS

One or more embodiments are illustrated by the pictures in the corresponding drawings, which are not to be limiting to the embodiments. Elements having same reference numeral numerals in the drawings are represented as similar elements, and the figures in the drawings are not to be scale limiting unless otherwise stated.

Figure 1:
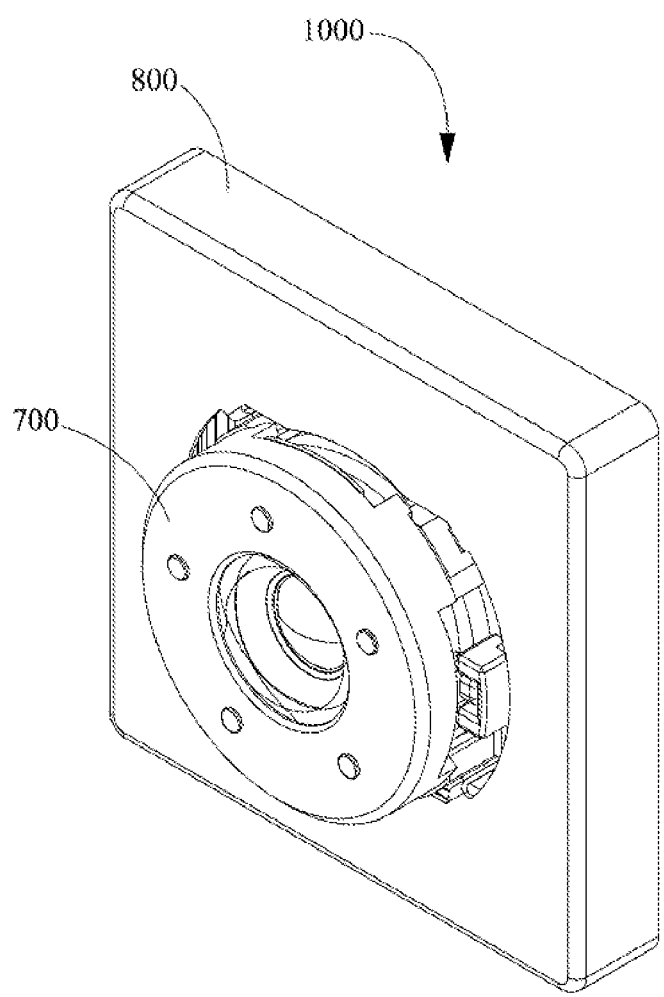
FIG. 1 is a schematic three-dimensional structural view of a camera module according to an embodiment of the present disclosure.
Figure 2:
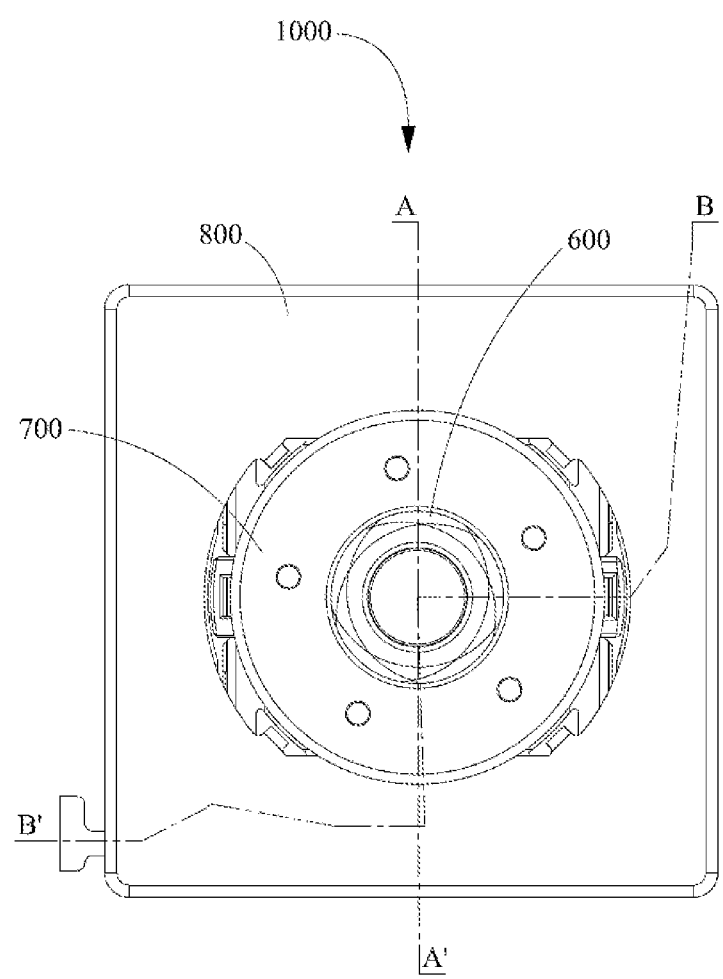
FIG. 2 is a front view of a camera module according to an embodiment of the present disclosure.
Figure 3:
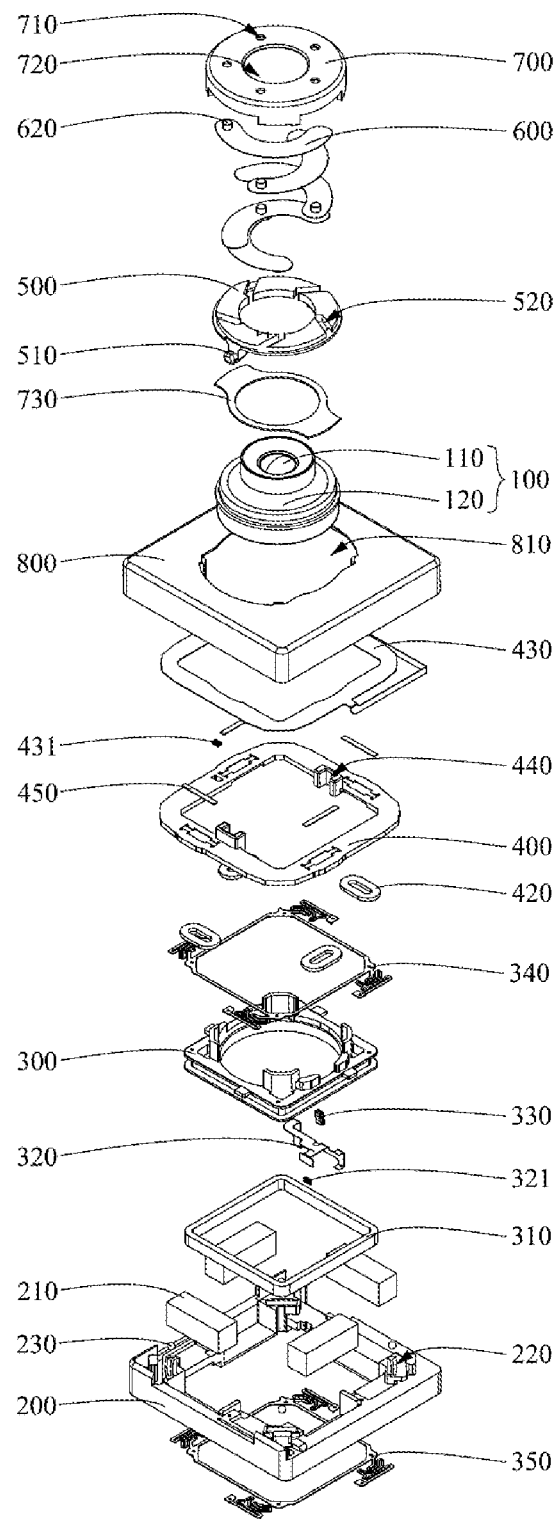
FIG. 3 is a schematic structural exploded view of a camera module according to an embodiment of the present disclosure.
Figure 4:
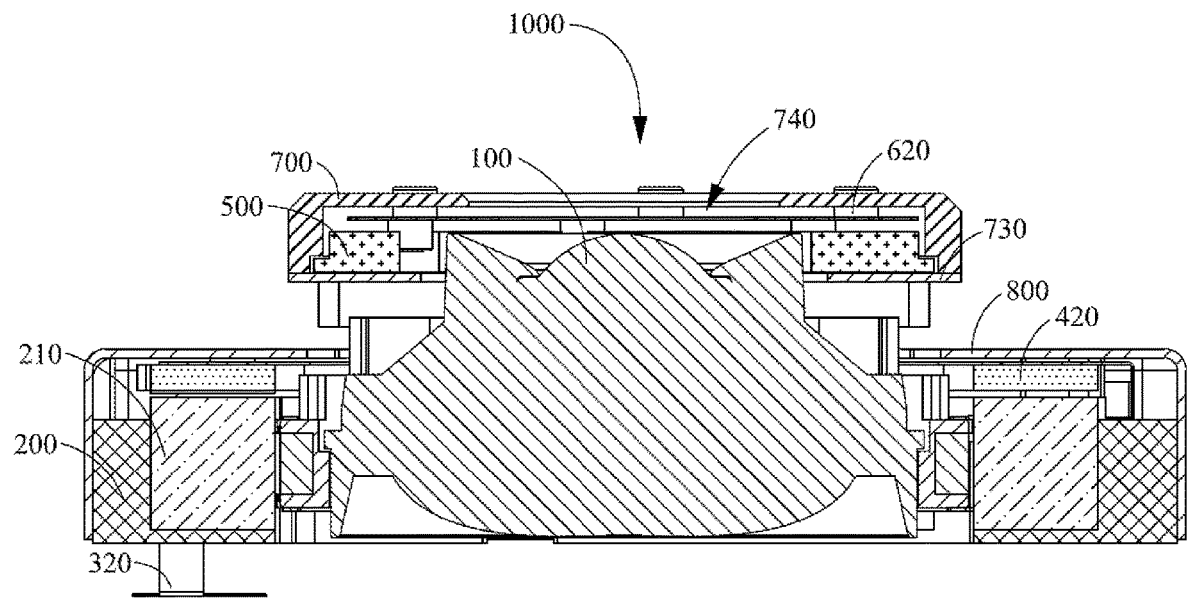
FIG. 4 is a schematic cross-sectional view of FIG. 2 along line AA'.
Figure 5:
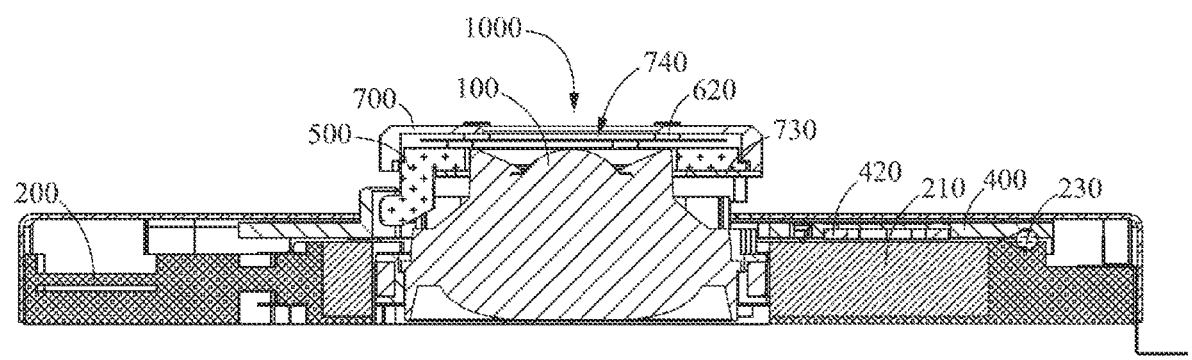
FIG. 5 is a schematic cross-sectional view of FIG. 2 along line BB'.

SYMBOL DESCRIPTION 100 camera lens
110 lens
120 lens barrel
200 base
210 driving member
220 first accommodating groove
230 spherical supporting member
300 lens supporting frame
310 first slave driven member
320 first flexible printed circuit
321 first sensing element
330 first position detection member
340 first leaf spring
350 second leaf spring
400 blade driving frame
410 second accommodating groove
420 second slave driven member
430 second flexible printed circuit
431 second sensing element
440 connecting slot
450 blade holding component
500 blade driving ring
510 connecting arm
520 through slot
521 limit portion
600 light-shielding blade
610 guide portion
620 positioning portion
700 blade supporting member
710 positioning hole
720 first central through hole
730 driving ring pressure plate
740 blade chamber
800 shell
810 second central through hole
820 bottom shell
900 anti-shake mechanism
910 sensor assembly
920 anti-shake base
921 anti-shake magnetic steel
922 first receiving recess
922a first spacer
923 mounting hole
923a damping member
930 movable bracket
931 fixing yoke
932a second spacer
933 ball
940 coil bracket
950 circuit board
1000 camera module

DETAILED DESCRIPTION OF THE EMBODIMENTS

In order to enable the object, technical solutions, and advantages of the embodiments of the disclosure clearer, embodiments of the disclosure may be described in detail below with reference to accompanying drawings. However, one of ordinary skill in the art may appreciate that in various embodiments of the disclosure, numerous technical details have been provided to better understand the application for the reader. It can be understood that even without these technical details and variations and modifications based on the following embodiments, the technical solutions herein may be realized.

In embodiments of the disclosure, terms "up", "down", "left", "right", "front", "back", "top", "bottom", "inside", "outside", "middle", "vertical", "horizontal", "transverse", "longitudinal", and the like indicating an orientation or positional relationship are orientation or positional relationship based on the drawings. These terms are mainly intended to better describe the disclosure and embodiments of the disclosure and are not intended to limit that the indicated device, element, or component must have a particular orientation or be constructed and operated in the particular orientation.

In addition, some of the above terms may be used to express other meanings besides the orientation or positional relationship. For example, the term "up" may also be used to express a certain attachment or connection relationship in some cases. The specific meanings of these terms in the disclosure may be understood by those of ordinary skill in the art according to actual situations.

Furthermore, terms "installation/mounting", "set-up", "providing", "definition", "connection", and "coupling" should be understood broadly. For example, the "connection" and "coupling" can be understood as a fixed connection, a detachable connection, or a monolithic construction. Alternatively, the "connection" and "coupling" can be understood as a mechanical connection or an electrical connection, or a direct connection, or indirect connection through an intermediate medium. Alternatively, the "connection" and "coupling" may indicate internal connection between two devices, elements, or components. The specific meanings of the above terms in the disclosure may be understood by those of ordinary skill in the art according to actual situations.

Furthermore, terms "first", "second", etc. are mainly used to distinguish from different devices, elements, or components (specific types and configurations of the devices, elements, or components may be the same or different), and are not intended to indicate or imply the relative importance and quantity of the indicated devices, elements, or components. Unless otherwise stated, "multiple/a plurality of" means two or more.

Embodiments of the present disclosure relates to a camera module 1000. As shown in FIGS. 1 to 5, the camera module includes: a camera lens 100, a base 200 provided with a driving member 210, a lens supporting frame 300 sleeved on an outer edge of the camera lens 100, a blade driving frame 400, a blade driving ring 500, a plurality of light-shielding blades 600, and a blade supporting member 700. The driving member 210 is configured to drive the lens supporting frame 300 to move and focus in an optical axis direction (i.e., a direction parallel to an optical axis). The blade driving frame 400 is rotatably arranged on the base 200 with the optical axis as a rotating axis and sleeved on an outer side of the camera lens 100, and the driving member 210 is further configured to drive the blade driving frame 400 to rotate. The blade driving ring 500 is disposed on the blade driving frame 400 and rotatably sleeved on the outer side of the camera lens 100 with the optical axis as a rotating axis, and the blade driving frame 400 is driven to rotate by the driving member 210 to drive the blade driving ring 500 to rotate. The plurality of light-shielding blades 600 are arranged on the blade driving ring 500 at intervals along a circumferential direction of the blade driving ring 500. In rotation of the blade driving ring 500, the plurality of light-shielding blades 600 are driven to be gathered or separated from each other.

The blade supporting member 700 is buckled and fixed on an object side of the lens supporting frame 300. The plurality of light-shielding blades 600 are disposed between the blade driving ring 500 and the blade supporting member 700. The plurality of light-shielding blades 600 are rotatably connected to the blade supporting member 700, and the blade supporting member 700 is used for supporting the plurality of light-shielding blades 600.

Compared with related technologies, in embodiments of the present disclosure, the base 200 is provided with the driving member 210, the driving member 210 is configured to drive the lens supporting frame 300 to move and focus along the optical axis direction, the driving member 210 is further configured to drive the blade driving frame 400 to rotate around the optical axis, and the blade driving frame 400 drives the blade driving ring 500 to rotate synchronously during rotating of the blade driving frame 400. The blade driving ring 500 drives the plurality of light-shielding blades 600 to be gathered or be separated from each other, thereby realizing adjustment of a size of an opening surrounded by the plurality of light-shielding blades 600. That is, since the plurality of light-shielding blades 600 are driven by the driving member 210 and focusing of the camera lens 100 is also driven by the driving member 210, the number of elements in the camera module 1000 can be reduced, thereby reducing the volume and weight of the camera module 1000, and avoiding interference between the structure for focusing in the camera module 1000 and a power mechanism for driving the light-shielding blades 600.

The following describes the implementation details of the camera module of embodiments in detail. The following content is only for the convenience of understanding the implementation details provided, and is not necessary to implement this solution.

In embodiments of the disclosure, the base 200, the blade driving frame 400, the blade driving ring 500, the plurality of light-shielding blades 600, and the blade supporting member 700 are sequentially arranged in a direction from an image side toward an object side of the camera module 1000. That is, those components are sequentially arranged in the optical axis direction, so that the camera module 1000 can be assembled along the extending direction of the optical axis, thereby reducing the difficulty of assembly and avoiding multi-direction protrusion of the components.

It shall be understood that the camera lens 100 includes a lens 110 and a lens barrel 120. The lens 110 is fixed to an inner wall of the lens barrel 120, and the lens barrel 120 is used to protect the lens 110 to prevent the lens 110 from being damaged. The lens barrel 120 can also provide a space to allow the camera lens 100 to be connected to the lens supporting frame 300. That is, the lens supporting frame 300 is sleeved and fixed on an outer wall of the lens barrel 120.

Figure 6:
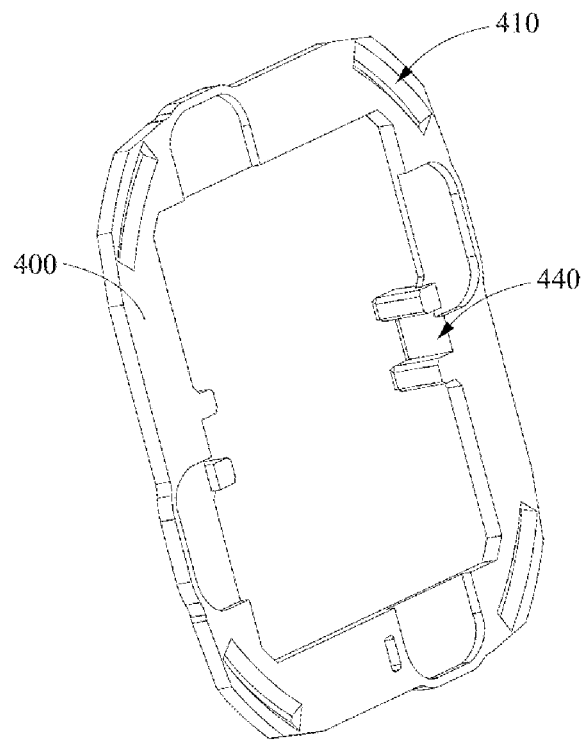
FIG. 6 is a schematic three-dimensional structural view of a blade driving frame of a camera module according to an embodiment of the present disclosure.

Referring to FIG. 6, in this embodiment, the base 200 defines at least three arc-shaped first accommodating grooves 220 on a side of the base 200 facing the blade driving frame 400, where the arc-shaped first accommodating groove means that the first accommodating groove is extended in an arc shape. The blade driving frame 400 defines at least three arc-shaped second accommodating grooves 410 on a side of the blade driving frame 400 facing the base 200, where the arc-shaped second accommodating groove means that the second accommodating groove is extended in an arc shape. The first accommodating grooves 220 and the second accommodating grooves 410 are arranged in one-to-one correspondence, and each first accommodating groove 220 and a respective second accommodating groove 410 define an accommodating space. A spherical supporting member 230 is disposed in the accommodating space and abuts against an inner wall of the first accommodating groove 220 and an inner wall of the respective second accommodating groove 410 concurrently. That is, when the driving member 210 drives the blade driving frame 400 to rotate, the spherical supporting member 230 can function as supporting the blade driving frame 400 and can support smoothly rotation of the blade driving frame 400 by means of rolling of the spherical supporting member 230. Alternatively, there may be four first accommodating grooves 220 and four second accommodating grooves 410, and the four first accommodating grooves 220 and four second accommodating grooves 410 are provided in one-to-one correspondence. Correspondingly, there may be also four spherical supporting members 230 provided.

Specifically, the first accommodating grooves 220 and the second accommodating grooves 410 are arranged around the optical axis and spaced apart from one another. The plurality of the first accommodating grooves 220 may or may not be arranged on a same circular trajectory, preferably arranged on the same circular trajectory. Similarly, the plurality of the second accommodating grooves 410 may or may not be arranged on a same circular trajectory, preferably arranged on the same circular trajectory.

In other feasible embodiments, there may be provided as three first accommodating grooves 220 and three second accommodating grooves 410, and thus there may be also three spherical supporting members 230 provided, where each of the three spherical supporting members 230 is accommodated in a respective accommodating space of the accommodating spaces. In this way, the blade driving frame 400 can be kept stable while being able to rotate relative to the base 200 when subjected to a force, and the blade driving frame 400 can be prevented from turning over in the extending direction of the optical axis. Furthermore, the number of the spherical supporting members 230 may be further reduced and the weight of the camera module 1000 may be further reduced.

It is to be noted that the number and position of the first accommodating grooves 220, the second accommodating grooves 410, and the spherical supporting members 230, and the number of the spherical supporting member 230 in each of the plurality of accommodating grooves can be determined according to the actual force demand, all of which belong to the idea of the present disclosure, which is not specifically limited in the present disclosure.

In this embodiment, the lens supporting frame 300 is provided with a first slave driven member (follower) 310, and the driving member 210 is configured to drive the first slave driven member 310 to move, to drive the lens supporting frame 300 to move and focus along the optical axis direction. The blade driving frame 400 is provided with a second slave driven member 420, and the driving member 210 is configured to drive the second slave driven member 420 to rotate, to drive the blade driving frame 400 to rotate. That is, the driving member 210 applies a force to the first slave driven member 310 for movement of the camera lens 100 to achieve focusing. Since the first slave driven member 310 is fixed to the lens supporting frame 300, the lens supporting frame 300 is driven to move. In addition, since the camera lens 100 is fixed to the lens supporting frame 300, the camera lens 100 also follows the movement of the lens supporting frame 300 to realize focusing. The driving member 210 applies a force to the second slave driven member 420 to cause the blade driving frame 400 to rotate with the optical axis as the rotating axis. The forces applied to the first slave driven member 310 and the second slave driven member 420 do not interfere with each other, thereby avoiding the interaction between the focusing movement and the blade movement.

Furthermore, the driving member 210 is a magnetic steel (e.g., a magnet), the first slave driven member 310 is a focusing coil, and the second slave driven member 420 is a blade driving coil. The magnetic steel drives the focusing coil to move along the optical axis direction when the focusing coil is powered on, so as to drive the lens supporting frame 300 to move along the optical axis direction for focusing. The magnetic steel drives the blade driving coil to rotate around the optical axis when the blade driving coil is powered on, so as to drive the blade driving frame 400 to rotate around the optical axis. Specifically, when the focusing coil and the blade driving coil are powered on, a Lorentz force is generated between the focusing coil, the blade driving coil, and the magnetic steel, and the focusing coil and the blade driving coil are driven to move by the Lorentz force. Therefore, when the movement for focusing and blade movement are required, the focusing coil and the blade driving coil can be powered on, thereby improving the controllability of the camera module 1000.

In embodiments of the disclosure, the focusing coil is circumferentially around the outer edge of the lens supporting frame 300. In this implement, the lens supporting frame 300 is substantially annular, and the focusing coil is wound around the outer wall of the lens supporting frame 300. When the focusing coil is energized (powered on), a Lorentz force is generated between the focusing coil and the magnetic steel, and since the magnetic steel is fixed on the base 200, the focusing coil drives the lens supporting frame 300 to move.

More specifically, there are a plurality of magnetic steels arranged on the base 200 and spaced apart from each other, and the plurality of magnetic steels are around the optical axis and disposed on a side of the base 300 facing the lens supporting frame 300.

Alternatively, in other feasible embodiments, there are multiple focusing coils, the multiple focusing coils are circumferentially arranged on the lens supporting frame 300, and the multiple focusing coils are spaced from one another. For example, the focusing coils are designated as four focusing coils, and the four focusing coils are arranged around the outer periphery of the lens supporting frame 300 and are equally spaced on the lens supporting frame 300. When the focusing coil is energized, the four focusing coils are all subjected to force, to drive the lens supporting frame 300 to move. It shall be understood that there may be other numbers of the focusing coils, such as two focusing coils, three or more focusing coils. Preferably, the multiple focusing coils are around the optical axis and equally spaced on the lens supporting frame 300, which can make the force applied on the lens supporting frame 300 more balanced and improve the stability and reliability of the camera module.

Furthermore, there are configured as multiple blade driving coils, and the multiple blade driving coils are circumferentially arranged on the blade driving frame 400 and spaced apart from one another. Similarly, there are four blade driving coils, and the four blade driving coils are spaced on the blade driving frame 400. When the blade driving coils are energized, a Lorentz force is generated between the blade driving coils and the magnetic steel, and the four blade driving coils are subjected to force to drive the blade driving frame 400 to rotate around the optical axis.

It is to be noted that the lens supporting frame 300 moves along the optical axis direction under the action of the Lorentz force, and the blade driving frame 400 rotates around the optical axis under the action of the Lorentz force. The reason is that Lorentz forces acting on the lens supporting frame 300 and the blade driving frame 400 have different directions, which is caused by that the focusing coils and the blade driving coils are arranged in different manners. Specifically, the direction of the Lorentz force can be determined according to the left-hand rule.

Furthermore, the lens supporting frame 300 is provided with a first flexible printed circuit 320, and the blade driving frame 400 is provided with a second flexible printed circuit 430. The first flexible printed circuit 320 and the second flexible printed circuit 430 are electrically connected with each other, so that when powered on, the first flexible printed circuit 320 and the second flexible printed circuit 430 can be energized concurrently to realize the synchronous adjustment of focusing and the aperture size.

Referring again to FIG. 3, in the present embodiment, it is also necessary to detect the focusing movement amount of the lens supporting frame 300 and the rotation amount of the blade driving frame 400 to precisely control the focusing and aperture adjustment of the camera module 1000. Specifically, a first position detection member 330 is provided on the lens supporting frame 300, and the first flexible printed circuit 320 is electrically connected with a first sensing element 321. During moving of the lens supporting frame 300, the first sensing element 321 detects a change of relative positions of the first position detection member 330 to determine the focusing movement amount of the lens supporting frame 300. For example, the first position detection member 330 can be a magnet, and the first sensing element 321 can be a Hall element. When the lens supporting frame 300 moves along the optical axis direction, the magnet follows the movement of the lens supporting frame 300, and the position of the Hall element is relatively fixed, resulting in a constantly changing magnetic field at the position of the Hall element, which may be mainly reflected in the constantly changing magnetic flux passing through the Hall element, thereby allowing detection of the movement amount of the lens supporting frame 300.

The second flexible printed circuit 430 is electrically connected with a second sensing element 431. During rotation of the blade driving frame 400, the second sensing element 431 determines a rotation angle of the blade driving frame 400 by detecting a relative position of the driving member 210. For example, when the driving member 210 is a magnetic member (e.g., magnetic steel), the second sensing element 431 may be a Hall element, and the driving member 210 drives the blade driving frame 400 to rotate to drive the second sensing element 431 to move, and the second sensing element 431 determines the rotation angle of the blade driving frame 400 by detecting changes in magnetic flux caused by the driving member 210 at different positions.

Furthermore, the lens supporting frame 300 is further provided with a first leaf spring 340 and a second leaf spring 350. The first leaf spring 340 is fixed on a surface of the object side of the lens supporting frame 300 and the second leaf spring 350 is fixed on a surface of the image side of the lens supporting frame 300. In addition, the first leaf spring 340 is fixed on a surface of the object side of the base 200 and the second leaf spring 350 is fixed on a surface of the image side of the base 200, thereby suspending and fixing the lens supporting frame 300 on the base 200.

In this embodiment, in order to avoid the blade driving ring 500 interfering with the camera lens 100 during focusing of the camera lens 100, the blade driving ring 500 needs to be movable along the optical axis direction. Specifically, the blade driving ring 500 is provided with a connecting arm 510, and the blade driving frame 400 defines a connecting slot 440, and the connecting arm 510 is slidably inserted into the connecting slot 440 along the optical axis direction so that the blade driving ring 500 and the blade driving frame 400 are clamped and connected with each other. Specifically, the connecting slot 440 penetrates through the blade driving frame 400 in the optical axis direction, but clamps the connecting arm 510 in the direction perpendicular to the optical axis direction. That is, the connecting slot 440 is a through slot extending in the optical axis direction. In this way, during rotation of the blade driving frame 400, the blade driving frame 400 can drive the blade driving ring 500 to rotate around the optical axis without affecting the movement of the blade driving ring 500 in the extending direction of the optical axis. Since the blade driving ring 500 is sleeved on the outer side of the camera lens 100, when the camera lens 100 is driven by the lens supporting frame 300 to move along the optical axis towards a direction away from the base 200, the outer edge of the lens barrel 120 pushes the blade driving ring 500 to move in a same direction, and in this case, the connecting arm 510 slides in the connecting slot 440.

Optionally, there are multiple connecting arms 510 and multiple connecting slots 440. The multiple connecting arms 510 and the multiple connecting slots 440 are clamped and connected correspondingly one by one. Preferably, there may be two connecting arms 510 provided, which are respectively provided on two opposing sides of the blade driving ring 500. There may be two connecting slots 440 provided, which are respectively provided on two opposing sides of the blade driving frame 400. In this way, the stability between the blade driving frame 400 and the blade driving ring 500 can be improved without increasing the manufacturing difficulty of the camera module 1000.

Figure 7A:
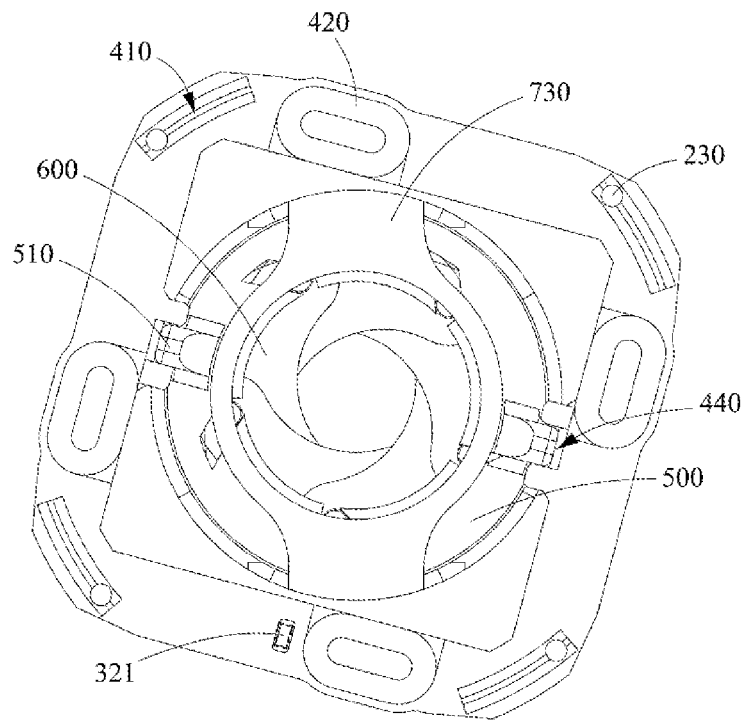
FIG. 7A is a schematic view of a plurality of light-shielding blades of the camera module being gathered to a limit position according to an embodiment of the present disclosure.
Figure 7B:
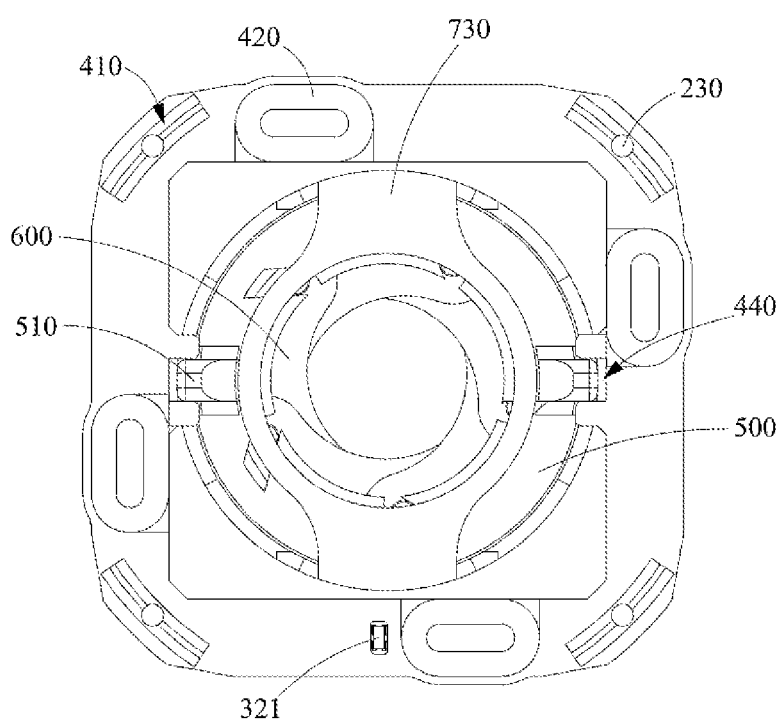
FIG. 7B is a schematic view of a plurality of light-shielding blades of the camera module being in a separation process according to an embodiment of the present disclosure.
Figure 7C:
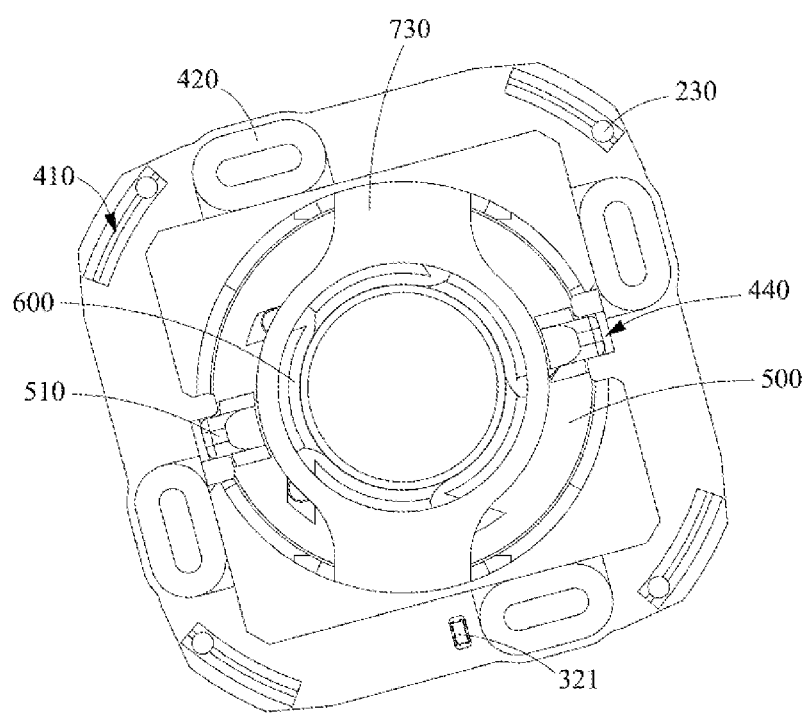
FIG. 7C is a schematic view of a plurality of light-shielding blades of the camera module being separated from each other to a limit position according to an embodiment of the present disclosure.

Referring to FIG. 7A to FIG. 7C, driven by the blade driving frame 400, the blade driving ring 500 rotates and drives the multiple light-shielding blades 600 to be gathered or be separated from each other, thereby adjusting the size of the aperture. FIG. 7A is a schematic view of a plurality of light-shielding blades 600 of the camera module 1000 being gathered to a limit position. FIG. 7B is a schematic view of a plurality of light-shielding blades 600 of the camera module 1000 being in a separation process. FIG. 7C is a schematic view of a plurality of light-shielding blades 600 of the camera module 1000 being separated from each other to a limit position.

It can be understood that the blade driving ring 500, the multiple light-shielding blades 600, and the blade supporting member 700 constitute an adjustable diaphragm. When the blade driving ring 500 is driven to rotate, the blade driving ring 500 drives the multiple light-shielding blades 600 to move, thereby changing the aperture of the adjustable diaphragm, and accordingly adjusting the amount of light that can pass through the adjustable diaphragm. When current is applied to the blade driving coil, the rotation of the blade driving frame 400 can drive the blade driving ring 500 to rotate, and the blade driving ring 500 drives the multiple light-shielding blades 600 to be gathered, resulting in the opening surrounded by the multiple light-shielding blades 600 becoming smaller and thus reducing the amount of light entering the camera module 1000. Alternatively, the blade driving ring 500 drives the multiple light-shielding blades 600 to be separated from one another, resulting in the opening surrounded by the multiple light-shielding blades 600 becoming larger and thus increasing the amount of light entering the camera module 1000. In some cases, the blade driving frame 400 may also rotate due to an undesirable action or vibration, resulting in a change in the amount of light entering the camera module 1000 that does not conform to expectations. To avoid a similar situation, the camera module 1000 of the present embodiment further includes a blade holding component 450, and the blade holding component 450 is fixed to the blade driving frame 400, and the blade holding component 450 is cooperated with the driving member 210 to cause the blade driving frame 400 to remain at an initial position in the power-off state. Therefore, in the case where the blade driving coil is not powered on, even if the blade driving frame 400 rotates due to an unexpected vibration, causing the multiple light-shielding blades 600 to move, the blade holding component 450 and the driving member 210 can cooperate with each other to cause the blade driving frame 400 to keep at the initial position, thereby stabilizing the positions of the multiple light-shielding blades 600 and maintaining the size and shape of the opening surrounded by the multiple light-shielding blades 600 relatively stable, thereby keeping the amount of light entering the camera module 1000 stable.

Specifically, the blade holding component 450 and the driving member 210 are both magnetic members, and the driving member 210 attracts the blade holding component 450 to maintain an angle of the blade driving frame 400 relative to the base 200. More specifically, the driving member 210 in this embodiment is a magnetic steel, and the blade holding component 450 is a yoke. The magnetic steel attracts the yoke by magnetic force, causing the position of the blade driving frame 400 to remain relatively stable relative to the base 200. In the power-off state, when an unexpected action or vibration causes the blade driving frame 400 to rotate, under the action of the attractive force between the magnetic steel and the yoke, the blade driving frame 400 automatically resets, causing the multiple light-shielding blades 600 to remain at a relatively stable position, thereby maintaining the size of the aperture.

It can be understood that in this embodiment, the base 200 and the blade driving frame 400 are relatively fixed in the extending direction of the optical axis by the attractive force between the driving member 210 and the blade holding component 450. Specifically, the driving member 210 attracts the blade holding component 450, and since the blade holding component 450 is fixed to the blade driving frame 400, the blade driving frame 400 is driven by the blade holding component 450 to be relatively fixed to the base 200. As can be seen from the above disclosure, a plurality of the spherical supporting members 230 are clamped between the base 200 and the blade driving frame 400. The spherical supporting members 230 can roll relatively to the base 200 and the blade driving frame 400. Since the movement track of the spherical supporting member 230 is constrained by the first accommodating groove 220 and the second accommodating groove 410, when the blade driving frame 400 is subjected to the Lorentz force between the driving member 210 and the second slave driven member 420, the blade driving frame 400 can rotate relatively to the base 200 in a plane perpendicular to the optical axis with the optical axis as the rotating axis.

Optionally, there may be multiple blade holding components 450, and the multiple blade holding components 450 are circumferentially around the blade driving frame 400 and spaced apart from each other. In this way, the attractive force between the magnetic steel and the yoke can be increased, and the stability of the positions of the plurality of light-shielding blades 600 can be improved. Preferably, the length of each of the blade holding components 450 is not less than 20% of the length of the driving member 210, so that the attractive force between each pair of the yoke and the magnetic steel can be increased, and the stability of the positions of the plurality of light-shielding blades 600 can be improved. In addition, the attractive force can also be changed by adjusting the length of the yoke, thereby changing the reset ability of the aperture. More preferably, when the blade holding component 450 and the driving member 210 are directly facing each other, a geometric center of the blade holding component 450 and a geometric center of the driving member 210 are connected by a line in parallel to the optical axis. The arrangement of the yoke and the magnetic steel in this position can more effectively utilize the magnetic force than other arrangements.

For the driving member 210 and the blade holding member 450, the use of the magnetic force between them to fix the position of the blade driving frame 400 has a similar effect to fixing the position of the blade driving frame 400 with an elastic member (such as a spring). Therefore, the interaction force between the driving member 210 and the blade holding member 450 can be adjusted by adjusting the size, shape, position, and the material of the driving member 210 and the blade holding member 450, which is similar to adjusting the elastic coefficient of the elastic member, thereby changing the ability of the blade driving frame 400 to reset during vibrating or shaking.

It shall be understood that, in this embodiment, in order to reduce the difficulty of manufacturing and testing the camera module 1000, the magnetic steels used as the driving members 210 may have exactly same specifications (such as size, shape, material, etc.). When there are multiple first slave driven members 310, the focusing coils used as the first slave driven members 310 may be coils having identical specifications. Similarly, the blade driving coils used as the second slave driven members 420 may have identical specifications. In addition, if the first slave driven member 310 includes the multiple first slave driven members 310, the first slave driven member 310 and the second slave driven member 420 may be coils of identical specification. The yokes used as the blade holding components 450 may also be identical in specifications. In some cases, when different magnetic steels are required for the driving member 210, the specifications, number, and positions of the different magnetic steels can be adjusted according to the force situation. Similarly, the first slave driven members 310, the second slave driven members 420, and the blade holding component 450 can also be adjusted according to actual needs, which will not be described in detail here.

Furthermore, in order to improve the positional stability of the driving members 210, grooves may be defined on the base 200, where the number of grooves and a contour of each groove respectively correspond to the number of the driving members 210 and a contour of a respective driving member 210. Each driving member 210 may be disposed in the respective groove, and the driving member 210 may be limited and fixed by an inner wall of the respective groove. In addition, the connection strength between the driving members 210 and the base 200 may be strengthened by adhesive bonding. As for the first slave driven member 310, when the first slave driven member 310 is a focusing coil surrounding the outer periphery of the lens supporting frame 300, the lens supporting frame 300 may define a groove extending in a circumferential direction on an outer edge of the lens supporting frame 300, and the first slave driven member 310 can be disposed in the groove circumferentially extended. When the first slave driven member 310 is a plurality of focusing coils arranged at intervals around the optical axis on the lens supporting frame 300, a plurality of grooves may be provided on the lens supporting frame 300, where the number of the plurality of grooves and a contour of each groove of the plurality of grooves respectively correspond to the number of the plurality of focusing coils and a contour of a respective focusing coil. Each first slave driven member 310 is disposed in the respective groove, and the first slave driven member 310 may be limited and fixed by an inner wall of the respective groove. For the second slave driven member 420, grooves can be arranged on the blade driving frame 400, where the number of the grooves and a contour of each groove of the grooves respectively correspond to the number of the second slave driven members 420 and a contour of a respective second slave driven member 420. Each second slave driven member 420 is disposed the respective groove, and the second slave driven member 420 can be limited and fixed by the inner wall of the respective groove. Similarly, the blade holding component 450 may be arranged in a same manner as the second slave driven member 420. In addition, in general, a size of the blade holding component 450 is smaller than that of the second slave driven member 420. Therefore, a groove for mounting the blade holding component 450 may be defined on the inner wall of the groove for mounting the second slave driven member 420. Thus, while meeting the mounting requirements of the second slave driven member 420 and the blade holding component 450, the blade holding component 450 may be limited by the second slave driven member 420 to prevent the blade holding component 450 from being separated from the blade driving frame 400.

In other feasible embodiments, the yoke may also be replaced by a magnetic fluid, and the principle using the magnetic fluid is the same as that using the magnetic yoke, which will not be described herein.

Figure 8:
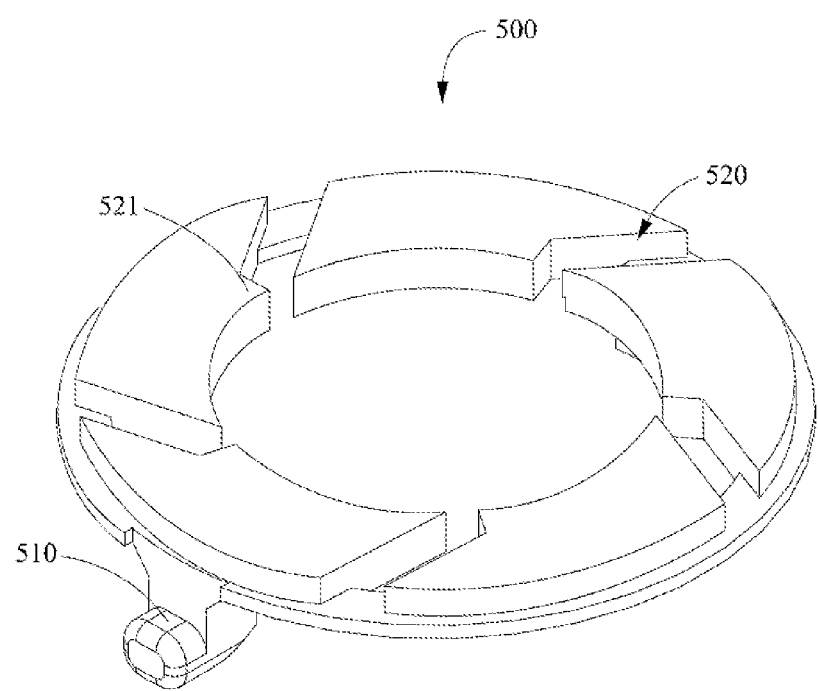
FIG. 8 is a schematic three-dimensional structural view of a blade driving ring of a camera module according to an embodiment of the present disclosure.
Figure 9:
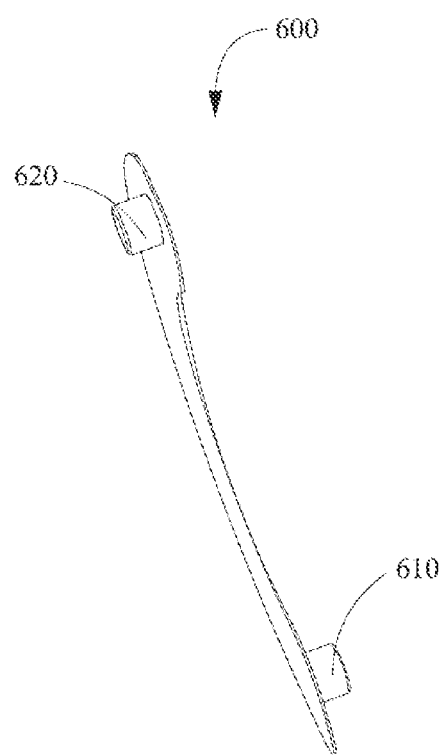
FIG. 9 is a schematic three-dimensional structural view of a light-shielding blade of a camera module according to an embodiment of the present disclosure.
Figure 10:
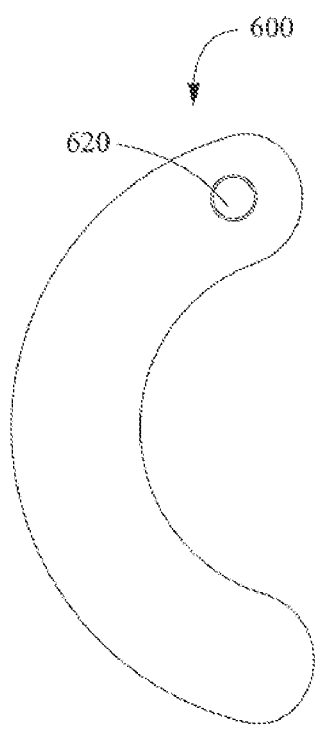
FIG. 10 is a front view of a light-shielding blade of a camera module according to an embodiment of the present disclosure.

Referring to FIGS. 8 to 10 together, in the present embodiment, the blade driving ring 500 defines a plurality of through slots 520, and the plurality of through slots 520 are spaced apart from one another in a circumferential direction of the blade driving ring 500. Each through slot 520 extends from an outer edge of the blade driving ring 500 to an inner edge of the blade driving ring 500, and an extending direction of each through slot 520 forms an angle with a radial direction of the blade driving ring 500. Each of the plurality of light-shielding blades 600 is in a shape of an arc-shaped sheet, each respective light-shielding blade 600 of the plurality of light-shielding blades 600 is provided with a guide portion 610 at an end of the respective light-shielding blade 600. The guide portion 610 is located on a surface of an image side of the light-shielding blade 600. The guide portions 610 of the plurality of light-shielding blades 600 are arranged in one-to-one correspondence with and slidably inserted into the through slots 520. Thus, when the blade driving ring 500 rotates, each guide portion 610 slides along a respective through slot 520 under the constraint of an inner wall of the respective through slot 520, thereby changing the size and shape of the opening surrounded by the plurality of light-shielding blades 600, and thereby changing the amount of light incident on the camera module 1000.

Furthermore, the inner wall of each of the plurality of through slots 520 is provided with a limit portion 521 at a position adjacent to the optical axis, and the limit portion 521 is configured to limit a movement range of the guide portion 610. In fact, the limit portion 521 causes a size of a part of the through slot 520 near the optical axis to decrease, and when the guide portion 610 moves to the limit portion 521, the guide portion 610 is blocked by the limit portion 521. The guide portion 610 may not be detached from the through slot 520. Furthermore, the through slot 520 may also be provided with a limit portion 521 at a position away from the optical axis, so that the guide portion 610 can only slide in the through slot 520.

Alternatively, the guide portion 610 may be a protrusion protruding from a surface of the light-shielding blade 600. The specific shape and size of the protrusion can be set according to actual situations. Considering the influence of resistance, the guide portion 610 can preferably be a cylindrical structure. In other feasible embodiments, the guide portion 610 cane also be appropriately adjusted to other shapes.

Figure 11:
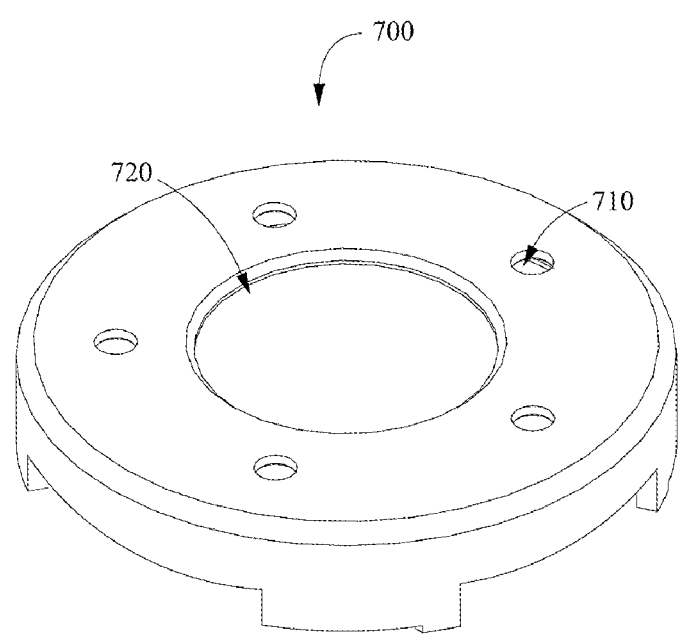
FIG. 11 is a schematic three-dimensional structural view of a blade supporting member of a camera module according to an embodiment of the present disclosure.

Referring to FIG. 11, in the present embodiment, the blade supporting member 700 defines a plurality of positioning holes 710 spaced apart from each other and in a circumferential direction of the blade supporting member, and the respective light-shielding blade 600 is provided with a positioning portion 620 on the other end of the respective light-shielding blade 600. The positioning portion 620 is located on a surface of the object side of the respective light-shielding blade 600. The positioning portions 620 of the plurality of light-shielding blades 600 are in one-to-one correspondence with the plurality of positioning holes 710 and rotatably inserted into the positioning holes 710. That is to say, each of the light-shielding blades 600 is provided with a respective positioning portion 620 on the surface of the object side, and the respective positioning portion 620 is rotatably inserted into the respective positioning hole 710. When the blade driving ring 500 rotates, the inner wall of the through slot 520 exerts force on the guide portion 610, thereby driving the plurality of light-shielding blades 600 to move. Since the other end of the respective light-shielding blade 600 is constrained by the blade supporting member 700 via the respective positioning portion 620, the plurality of light-shielding blades 600 can still rotate, and therefore, the plurality of light-shielding blades 600 rotate to gather or separate around their respective axes corresponding to the positioning holes 710, thereby achieving the change in the size of the aperture.

In the present embodiment, the blade driving ring 500 is substantially annular, and the plurality of light-shielding blades 600 are all arc-shaped sheet. A length of each light-shielding blade 600 is 30% to 60% of a circumference of the blade driving ring 500. In this way, the light-shielding blade 600 can have a sufficient length while maintaining a relatively light weight, avoiding mutual interference in the movement processes of different light-shielding blades 600. In this embodiment, the plurality of light-shielding blades 600 are sequentially stacked and surrounded in an annular shape. Specifically, the guide portion 610 of a first light-shielding blade 600 is inserted into a through slot 520, and the positioning portion 620 on the other end of the first light-shielding blade 600 is inserted into a positioning hole 710. The surface of the image side of the end of a second light-shielding blade 600 provided with the guide portion 610 is in close contact with the surface of the object side of the end of the first light-shielding blade 600 provided with the positioning portion 620. The guide portion 610 of the second light-shielding blade 600 is inserted into another through slot 520, and the positioning portion 620 of the second light-shielding blade 600 is inserted into another positioning hole 710. In similar manners, all the light-shielding blades 600 are arranged in an annular shape.

Furthermore, an area of an orthographic projection of the light-shielding blade 600 on a plane perpendicular to the optical axis is designated as a first area. An area of an orthographic projection of a sector, with an edge of the light-shielding blade 600 away from the optical axis as an arc, on the plane perpendicular to the optical axis is designated as a second area. The first area is 40% to 70% of the second area. In this way, the plurality of light-shielding blades 600 can be kept to have a relatively light weight, and interference between different light-shielding blades 600 can be avoided.

Alternatively, the number of the light-shielding blades 600 can be adjusted according to actual needs. Generally, the more the number of light-shielding blades 600, the closer the opening surrounded by the light-shielding blades 600 is to a circular shape. Considering the weight and manufacturing cost of the camera module, the number of the light-shielding blades 600 can be set to be five to seven.

Referring again to FIGS. 4 and 5, in the present embodiment, the blade supporting member 700 is in a shape of a groove having a first central through hole 720. The opening of the groove of the blade supporting member 700 faces the lens supporting frame 300. A driving ring pressure plate 730 is fixed on an edge of the blade supporting member 700 surrounding the opening of the groove. The driving ring pressure plate 730 and the blade supporting member 700 define a blade chamber 740. The blade driving ring 500 and the plurality of light-shielding blades 600 are located in the blade chamber 740. The driving ring pressure plate 730 is used for limiting a position of the blade driving ring 500 in the optical axis direction to prevent interference between the blade driving ring 500 and the camera lens 100 and hindering the rotation of the blade driving ring 500.

In this embodiment, the driving member 210, the first slave driven member 310, and the lens supporting frame 300 may constitute a focusing mechanism. The driving member 210, the second slave driven member 420, the blade driving frame 400, the blade driving ring 500, and the blade supporting member 700 may constitute a blade driving mechanism. The focusing mechanism and the blade driving mechanism are driven by the driving member 210.

In the present embodiment, the camera module 1000 further includes a shell 800 having a receiving space. The base 200, the lens supporting frame 300, and the blade driving frame 400 are located in the receiving space. The shell 800 has a second central through hole 810, and the second central through hole 810 is used to expose the blade driving ring 500, the plurality of light-shielding blades 600, and the blade supporting member 700. The shell 800 is made of a magnetic material. The shell 800 being made of the magnetic material allows the focusing coil, the blade driving coil, and the magnet to be enclosed in a closed magnetic circuit to increase the overall magnetism.

Figure 12:
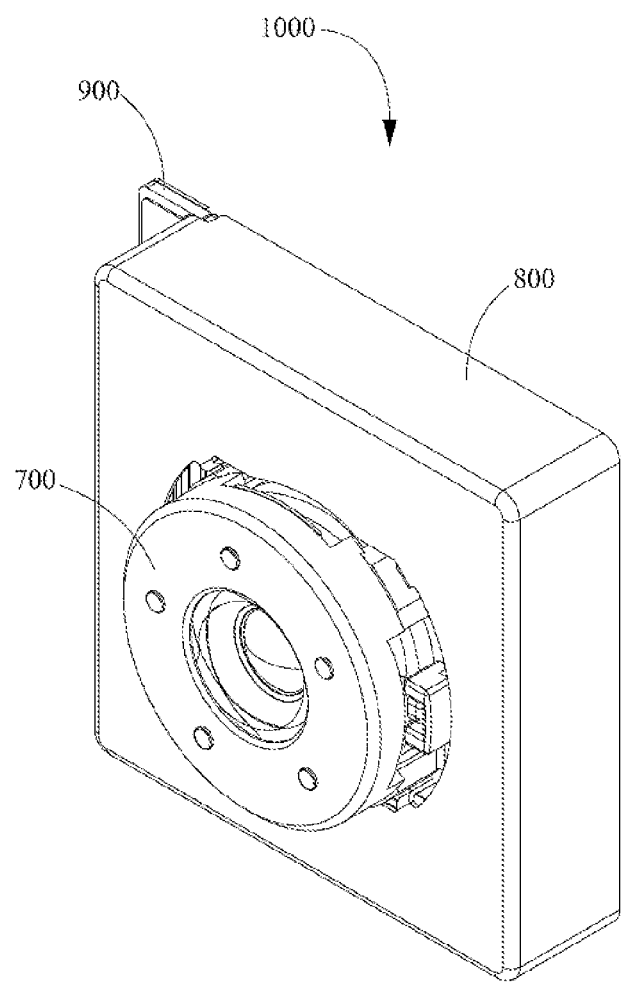
FIG. 12 is a schematic three-dimensional structural view of a camera module according to another embodiment of the present disclosure.
Figure 13:
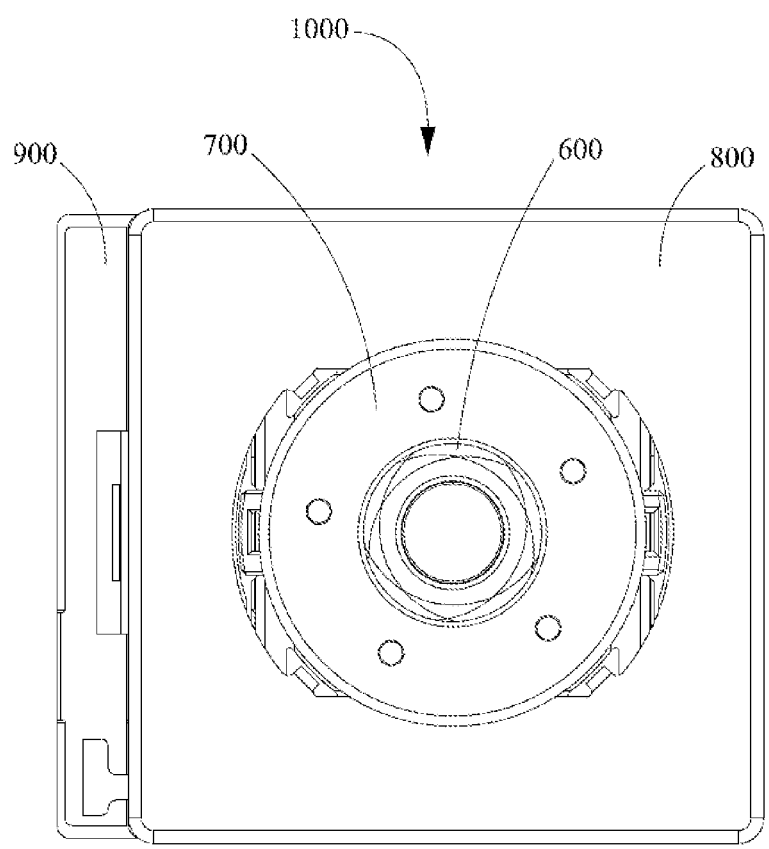
FIG. 13 is a front view of a camera module according to another embodiment of the present disclosure.
Figure 14:
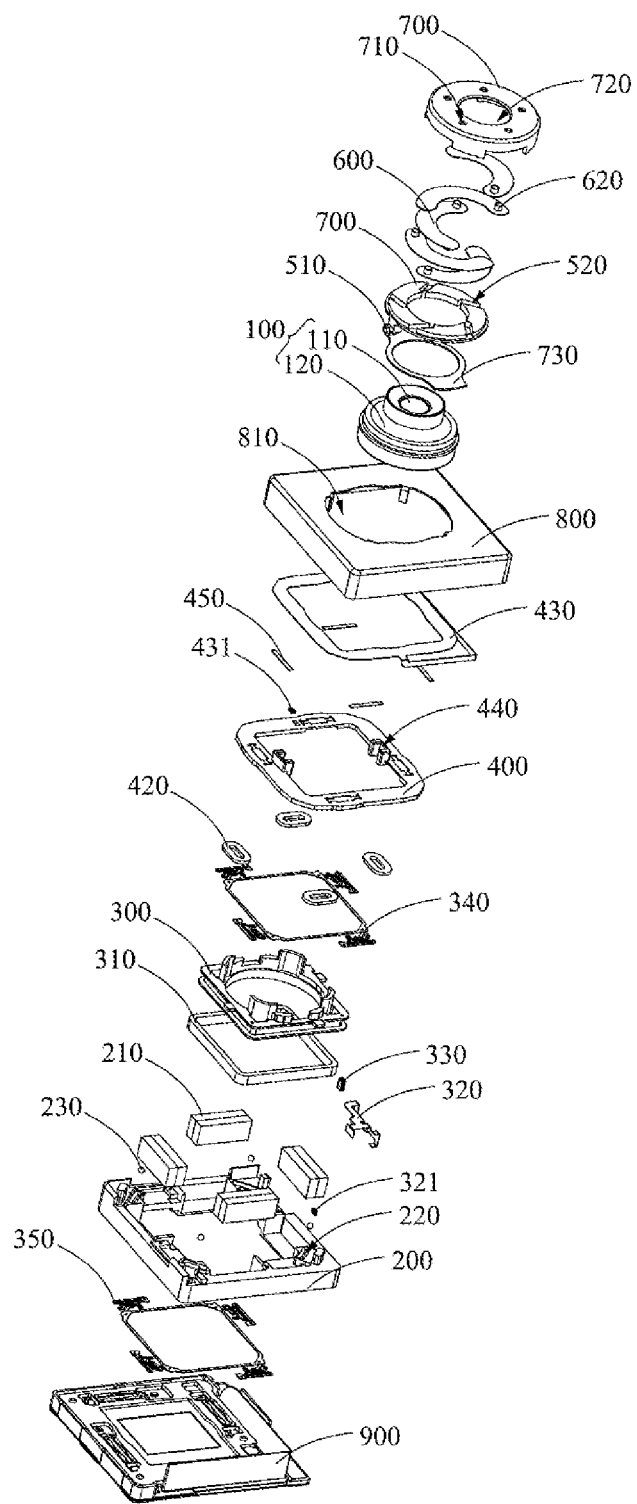
FIG. 14 is a schematic structural exploded view of a camera module according to another embodiment of the present disclosure.

Another embodiment of the present disclosure relates to an camera module 1000. As shown in FIG. 12, the camera module 1000 of this embodiment is substantially the same as that of the previous embodiment, except that the camera module 1000 of this embodiment further includes an anti-shake mechanism 900 and a sensor assembly 910 provided on the anti-shake mechanism 900. The anti-shake mechanism 900 is located on an image side of the base 200, and the anti-shake mechanism 900 is used to drive the sensor assembly 910 to achieve anti shaking.

Compared with the previous embodiment, in this embodiment, in addition to achieving focusing in the optical axis direction and achieving aperture adjustment by using the plurality of light-shielding blades 600, the anti-shake mechanism 900 can be utilized to correct the jitter of the sensor assembly 910 in the direction perpendicular to the optical axis, which can further improve the shooting effect of the camera module 1000. In addition, since the driving of the sensor assembly 910 by the anti-shake mechanism 900 and the driving of the lens 100 by the driving member 210 to are independent of each other, the change in the drive of the driving member 210 in focusing and aperture adjustment has no impact on the drive of the anti-shake mechanism 900 in shake-proof. In other words, the drive of the anti-shake mechanism 900 for correcting the jitter of the sensor assembly 910 has no impact on the drive of the driving member 210. Thus, in the performance evaluation of the camera module 1000, the performance of the focusing mechanism, the blade driving mechanism, and the anti-shake mechanism 900 can be separately tested, which can reduce the testing difficulty of the camera module. The camera module of the present disclosure improves reliability due to the simplification of the structure, and realizes improvement in component configuration, thereby reducing failure rate.

Figure 15:
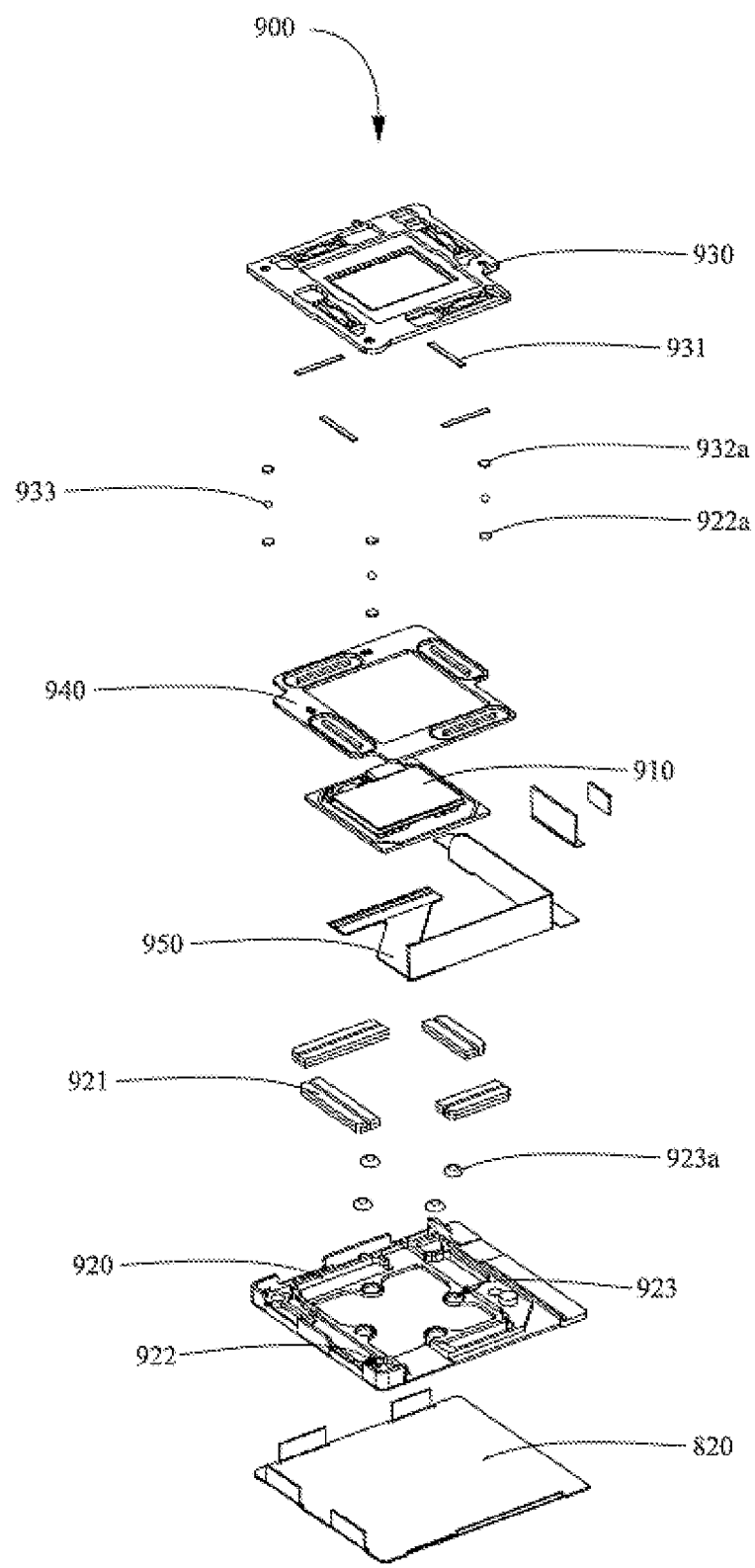
FIG. 15 is a structural explosion view of an anti-shake mechanism of a camera module according to another embodiment of the present disclosure.

Referring to FIG. 15, specifically, the camera module 1000 further includes a bottom shell 820. The bottom shell 820 and the shell 800 cooperate with each other to enclose and fix the lens 100, the focusing mechanism, the blade driving mechanism, and the anti-shake mechanism. Preferably, the bottom shell 820 can also be made of a magnetic material.

In this embodiment, the anti-shake mechanism 900 includes an anti-shake base 920 and a movable bracket 930. The movable bracket 930 is located on an object side of the anti-shake base 920 and is movable relative to the anti-shake base 920 in a direction perpendicular to the optical axis. The sensor assembly 910 is fixed to the movable bracket 930. Thus, the movement of the movable bracket 930 drives the movement of the sensor assembly 910, thereby realizing the shake-proof function of the camera module 1000.

Specifically, the anti-shake base 920 is provided with a plurality of magnetic steels for anti-shaking (anti-shake magnetic steels) 921 arranged around the optical axis and spaced apart from each other, and the movable bracket 930 is provided with a plurality of fixing yokes 931 arranged around the optical axis and spaced apart from each other. At least three balls 933 are interposed between the anti-shake base 920 and the movable bracket 930, and the anti-shake magnetic steels 921 and the fixing yokes 931 attract each other to cause the anti-shake base 920 and the movable bracket 930 to approach each other, thereby clamping all the balls 933. Since the balls 933 are spherical, when the balls 933 roll, the movable bracket 930 is movable relative to the anti-shake base 920.

More specifically, the anti-shake base 920 is provided with a plurality of first receiving recesses 922, the movable bracket 930 is provided with a plurality of second receiving recesses (not shown in the figures), and the plurality of balls 933 and the plurality of first receiving recesses 922 are in one-to-one correspondence and the plurality of balls 933 are located in the first receiving recesses 922. The plurality of second receiving recesses and the plurality of first receiving recesses 822 are in one-to-one correspondence. By using the receiving recesses to receive the balls 933, the movement range of the balls 933 can be limited, the balls 933 can be prevented from falling off, and the stability of the camera module 1000 can be improved.

In this embodiment, each of the first receiving recesses 922 is provided with a first spacer 922a, and each of the second receiving recesses is provided with a second spacer 932a. The first spacer 922a and the second spacer 932a are both used to support the ball 933.

In this embodiment, the anti-shake mechanism 900 includes a coil bracket 940 fixed to the movable bracket 930, and the coil bracket 940 is provided with a plurality of anti-shaking coils (not shown in the figures) arranged around the optical axis and spaced apart from each other. The plurality of anti-shaking coils and the plurality of anti-shake magnetic steels 921 are in one-to-one correspondence and oppositely arranged. When the anti-shaking coil is energized, a Lorentz force is generated between the anti-shaking coil and the anti-shake magnetic steels 921, thereby causing the coil bracket 940 to move in a direction perpendicular to the optical axis, and then driving the movable bracket 930 to synchronously movement. When the movable bracket 930 moves, the sensor assembly 910 follows the movement of the movable bracket 930, thereby realizing the shake-proof of the camera module 1000.

That is to say, the anti-shake base 920 and the movable bracket 930 are relatively fixed in the extending direction of the optical axis by the attractive force between the anti-shake magnetic steel 921 and the fixing yoke 931, and the balls 933 is rollable in the first receiving recess 922 and the second receiving recess. That is, the balls 933 is rollable relatively to the anti-shake base 920 and the movable bracket 930. When the movable bracket 930 is subjected to the Lorentz force between the anti-shake magnetic steel 921 and the anti-shaking coil, the movable bracket 930 can move relatively to the anti-shake base 920 in a plane perpendicular to the optical axis, thereby causing the sensor assembly 810 to move in the plane perpendicular to the optical axis, thereby achieving anti-shaking.

Specifically, in this embodiment, the camera module 1000 supplies power to the plurality of anti-shaking coils through the circuit board 950.

In this embodiment, the anti-shake base 920 defines a mounting hole 923, and a damping member 923a is provided in the mounting hole 923. The damping member 923a penetrates through the mounting hole 923 and contacts the bottom shell 820 and the sensor assembly 910. More specifically, the bottom shell 820 and the sensor assembly 910 clamp the damping member 923a so that the damping member 923a is slightly deformed. Thus, the damping member 923a can provide resistance when the sensor assembly 910 moves, so that the moving speed of the sensor assembly 910 is slowed down, thereby avoiding unnecessary vibration caused by the rapid movement of the sensor assembly 910 in the anti-shaking process.

For example, in this embodiment, there are four mounting holes 923 and four damping members 923a, and the four mounting holes 923 and the four damping members 923a are both arranged around the optical axis and space apart from each other. The damping member 923a is made of rubber. It shall be understood that there may be other numbers of mounting holes 923 and damping members 923a, and the damping member 923a can also be made of silicone gel or other materials with certain elasticity and capable of providing frictional resistance.

Another embodiment of the present disclosure provides a camera, and the camera includes a camera body and the camera module as described in either of the two embodiments above, where the camera module is arranged on the camera body.

Another embodiment of the present disclosure provides an electronic device, and the electronic device includes a device body and the camera module as described in either of the two embodiments above, where the camera module is arranged on the device body.

It shall be understood that the electronic device in this embodiment can be a portable terminal, such as a smart phone, a tablet computer, a notebook computer, or a smart watch, or the like.

The camera module, the camera, and the electronic device provided in the embodiments of the present disclosure have been described in detail above. Specific examples are applied to explain the principles and implementations of the present disclosure. The description of the above implementations is only used to help understand the idea of the present disclosure. There will be changes in the specific implementations and application scope. In conclusion, the content of this specification should not be understood as limitations to the present disclosure.

What is claimed is:

1. A camera module, comprising:
a camera lens;
a base provided with a driving member;
a lens supporting frame sleeved on an outer edge of the camera lens, wherein the driving member is configured to drive the lens supporting frame to move and focus along an optical axis direction;
a blade driving frame rotatably disposed on the base with an optical axis as a rotating axis and sleeved on an outer side of the camera lens, wherein the driving member is further configured to drive the blade driving frame to rotate;
a blade driving ring disposed on the blade driving frame and rotatably sleeved on the outer side of the camera lens with the optical axis as a rotating axis, wherein the blade driving frame is driven to rotate by the driving member to drive the blade driving ring to rotate;
a plurality of light-shielding blades circumferentially arranged on the blade driving ring and spaced apart from each other, wherein in rotation of the blade driving ring, the plurality of light-shielding blades are driven to gather or separate;
and a blade supporting member fixed on an object side of the lens supporting frame, wherein the plurality of light-shielding blades are located between the blade driving ring and the blade supporting member, each of the plurality of light-shielding blades is rotatably connected to the blade supporting member, and the blade supporting member is configured to support the plurality of light-shielding blades.

2. The camera module of claim 1, wherein the lens supporting frame is provided with a first slave driven member, and the driving member is configured to drive the first slave driven member to move, to drive the lens supporting frame to move and focus along the optical axis direction; and
wherein the blade driving frame is provided with a second slave driven member, and the driving member is configured to drive the second slave driven member to rotate, to drive the blade driving frame to rotate.

3. The camera module of claim 2, wherein the driving member is a magnetic steel, the first slave driven member is a focusing coil, and the second slave driven member is a blade driving coil;
in response to the focusing coil being energized, the magnetic steel is configured to drive the focusing coil to move along the optical axis direction, to drive the lens supporting frame to move and focus along the optical axis direction; and
in response to the blade driving coil being electrified, the magnetic steel is configured to drive the blade driving coil to rotate around the optical axis, to drive the blade driving frame to rotate around the optical axis.

4. The camera module of claim 1, wherein the base defines at least three arc-shaped first accommodating grooves on a side of the base facing the blade driving frame, the blade driving frame defines at least three arc-shaped second accommodating grooves on a side of the blade driving frame facing the base; and
wherein the at least three first accommodating grooves and the at least three second accommodating grooves are arranged in one-to-one correspondence and form accommodating spaces, wherein each of the accommodating spaces accommodates a spherical supporting member, and the spherical supporting member abuts against an inner wall of a respective first accommodating groove and an inner wall of a respective second accommodating groove concurrently.

5. The camera module of claim 1, wherein the camera module further comprises a blade holding component fixed to the blade driving frame, wherein the blade holding component is cooperated with the driving member to keep the blade driving frame at an initial position in a power-off state.

6. The camera module of claim 1, wherein the blade driving ring defines a plurality of through slots spaced apart from one another in a circumferential direction of the blade driving ring;
wherein each respective through groove of the plurality of through grooves extends from an outer edge of the blade driving ring to an inner edge of the blade driving ring, and an extending direction of the respective through groove forms an angle with a radial direction of the blade driving ring; and
wherein each respective light-shielding blade of the plurality of light-shielding blades is an arc-shaped sheet, the respective light-shielding blade is provided with a guide portion at an end of the respective light-shielding blade, and the guide portion is located on a surface of an image side of the respective light-shielding blade, wherein a plurality of guide portions of the plurality of light-shielding blades are arranged in one-to-one correspondence with and slidably inserted into the plurality of through slots.

7. The camera module of claim 6, wherein the blade supporting member defines a plurality of positioning holes spaced apart from each other and in a circumferential direction of the blade supporting member, and the respective light-shielding blade is provided with a positioning portion on another end of the respective light-shielding blade, wherein the positioning portion is located on a surface of an object side of the respective light-shielding blade, and positioning portions of the plurality of light-shielding blades are in one-to-one correspondence with the plurality of positioning holes and rotatably inserted into the plurality of positioning holes.

8. The camera module of claim 1, wherein the blade driving ring is provided with a connecting arm, the blade driving frame defines a connecting slot, and the connecting arm is slidably inserted into the connecting slot along the optical axis direction to enable the blade driving ring and the blade driving frame to be clamped and connected with each other.

9. The camera module of claim 1, wherein the camera module further comprises a shell having a receiving space, and wherein the base, the lens supporting frame, and the blade driving frame are located in the receiving space; and wherein the shell has a central through hole for exposing the blade driving ring, the plurality of light-shielding blades, and the blade supporting member, and the shell is made of a magnetic material.

10. The camera module of claim 1, wherein the camera module further comprises an anti-shake mechanism and a sensor assembly provided on the anti-shake mechanism, and wherein the anti-shake mechanism is located on an image side of the base, and the anti-shake mechanism is configured to drive the sensor assembly to realize anti-shaking.

11. An electronic device, comprising a device body and the camera module of claim 1, wherein the camera module is provided on the device body.

12. A camera, comprising a camera body and a camera module provided on the camera body, wherein the camera module includes:
a camera lens;
a base provided with a driving member;
a lens supporting frame sleeved on an outer edge of the camera lens, wherein the driving member is configured to drive the lens supporting frame to move and focus along an optical axis direction;
a blade driving frame rotatably disposed on the base with an optical axis as a rotating axis and sleeved on an outer side of the camera lens, wherein the driving member is further configured to drive the blade driving frame to rotate;
a blade driving ring disposed on the blade driving frame and rotatably sleeved on the outer side of the camera lens with the optical axis as a rotating axis, wherein the blade driving frame is driven to rotate by the driving member to drive the blade driving ring to rotate;
a plurality of light-shielding blades circumferentially arranged on the blade driving ring and spaced apart from each other, wherein in rotation of the blade driving ring, the plurality of light-shielding blades are driven to gather or separate;
and a blade supporting member fixed on an object side of the lens supporting frame, wherein the plurality of light-shielding blades are located between the blade driving ring and the blade supporting member, each of the plurality of light-shielding blades is rotatably connected to the blade supporting member, and the blade supporting member is configured to support the plurality of light-shielding blades.

13. The camera of claim 12, wherein the lens supporting frame is provided with a first slave driven member, and the driving member is configured to drive the first slave driven member to move, to drive the lens supporting frame to move and focus along the optical axis direction; and
wherein the blade driving frame is provided with a second slave driven member, and the driving member is configured to drive the second slave driven member to rotate, to drive the blade driving frame to rotate.

14. The camera of claim 13, wherein the driving member is a magnetic steel, the first slave driven member is a focusing coil, and the second slave driven member is a blade driving coil;
in response to the focusing coil being energized, the magnetic steel is configured to drive the focusing coil to move along the optical axis direction, to drive the lens supporting frame to move and focus along the optical axis direction; and
in response to the blade driving coil being electrified, the magnetic steel is configured to drive the blade driving coil to rotate around the optical axis, to drive the blade driving frame to rotate around the optical axis.

15. The camera of claim 12, wherein the base defines at least three arc-shaped first accommodating grooves on a side of the base facing the blade driving frame, the blade driving frame defines at least three arc-shaped second accommodating grooves on a side of the blade driving frame facing the base; and
wherein the at least three first accommodating grooves and the at least three second accommodating grooves are arranged in one-to-one correspondence and form accommodating spaces, wherein each of the accommodating spaces accommodates a spherical supporting member, and the spherical supporting member abuts against an inner wall of a respective first accommodating groove and an inner wall of a respective second accommodating groove concurrently.

16. The camera of claim 12, wherein the camera module further comprises a blade holding component fixed to the blade driving frame, wherein the blade holding component is cooperated with the driving member to keep the blade driving frame at an initial position in a power-off state.

17. The camera of claim 12, wherein the blade driving ring defines a plurality of through slots spaced apart from one another in a circumferential direction of the blade driving ring;
wherein each respective through groove of the plurality of through grooves extends from an outer edge of the blade driving ring to an inner edge of the blade driving ring, and an extending direction of the respective through groove forms an angle with a radial direction of the blade driving ring; and
wherein each respective light-shielding blade of the plurality of light-shielding blades is an arc-shaped sheet, the respective light-shielding blade is provided with a guide portion at an end of the respective light-shielding blade, and the guide portion is located on a surface of an image side of the respective light-shielding blade, wherein a plurality of guide portions of the plurality of light-shielding blades are arranged in one-to-one correspondence with and slidably inserted into the plurality of through slots.

18. The camera of claim 17, wherein the blade supporting member defines a plurality of positioning holes spaced apart from each other and in a circumferential direction of the blade supporting member, and the respective light-shielding blade is provided with a positioning portion on another end of the respective light-shielding blade, wherein the positioning portion is located on a surface of an object side of the respective light-shielding blade, and positioning portions of the plurality of light-shielding blades are in one-to-one correspondence with the plurality of positioning holes and rotatably inserted into the plurality of positioning holes.

19. The camera of claim 12, wherein the blade driving ring is provided with a connecting arm, the blade driving frame defines a connecting slot, and the connecting arm is slidably inserted into the connecting slot along the optical axis direction to enable the blade driving ring and the blade driving frame to be clamped and connected with each other.

20. The camera of claim 12, wherein the camera module further comprises a shell having a receiving space, and wherein the base, the lens supporting frame, and the blade driving frame are located in the receiving space; and
wherein the shell has a central through hole for exposing the blade driving ring, the plurality of light-shielding blades, and the blade supporting member, and the shell is made of a magnetic material.

* * * * *